(12) United States Patent
Ferlinghetti (10) Patent No.: US 9,067,482 B1
(45) Date of Patent: Jun. 30, 2015

(54) EXTERIOR TRUCK BED AND TAILGATE ARMOR SYSTEMS

(71) Applicant: Lorenzo Ferlinghetti, Bolinas, CA (US)

(72) Inventor: Lorenzo Ferlinghetti, Bolinas, CA (US)

( * ) Notice: Subject to any disclaimer, the term of this patent is extended or adjusted under 35 U.S.C. 154(b) by 0 days.

(21) Appl. No.: 14/520,228

(22) Filed: Oct. 21, 2014

Related U.S. Application Data (60) Provisional application No. 61/899,603, filed on Nov. 4, 2013.

(51) Int. Cl.
*B60J 11/06* (2006.01)

(52) U.S. Cl.
CPC .......................................... *B60J 11/06* (2013.01)

(58) Field of Classification Search
CPC ................................... B60J 11/00; B60J 11/06
USPC ................ 280/762, 770; 296/136.01, 136.02, 296/136.07
See application file for complete search history.

(56) References Cited

U.S. PATENT DOCUMENTS

| | | | |
|---|---|---|---|
| 4,313,987 A | 2/1982 | McCormick | |
| 5,044,688 A * | 9/1991 | Jacobson | 296/136.07 |
| 5,209,545 A * | 5/1993 | Slaugh | 296/136.07 |
| 5,636,883 A * | 6/1997 | Johns | 296/39.2 |
| 5,641,179 A | 6/1997 | Imlach | |
| 5,938,263 A | 8/1999 | Barthelman | |
| 6,595,575 B2 * | 7/2003 | Morris | 296/136.02 |
| D646,616 S * | 10/2011 | Scott | D12/401 |
| 8,408,627 B2 * | 4/2013 | Mann | 296/39.2 |
| 2002/0038962 A1 * | 4/2002 | Perez | 296/136 |
| 2010/0007169 A1 * | 1/2010 | Nguyen | 296/136.07 |

\* cited by examiner

*Primary Examiner* — John Walters
(74) *Attorney, Agent, or Firm* — RG Patent Consulting, LLC; Rachel Gilboy (57) ABSTRACT

An exterior truck bed and tailgate armor system is an armored cover for the exterior surface of a pickup bed that is able to be quickly installed to protect the exterior surface of the pickup bed from scratches and minor dents. The truck-bed armor assembly has three sections to cover the left side, the right side and the tailgate of the truck bed. The left side and right side covers have a curled lip at the bottom edge that hook underneath the bottom edges of the bed, and fasten to the top edge of the lip of the bed using clamps that may be attached and tightened without the use of tools. The tailgate section hinges along the width of the upper periphery and uses flush mounting threaded fasteners on the upper periphery.

20 Claims, 5 Drawing Sheets

EXTERIOR TRUCK BED AND TAILGATE ARMOR SYSTEMS

CROSS-REFERENCE TO RELATED APPLICATION

The present application is related to and claims priority from prior provisional application Ser. No. 61/899,603, filed Nov. 4, 2013 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of truck and vehicle accessories and more specifically relates to an exterior truck bed and tailgate armor system.

2. Description of the Related Art

In the last century, the automobile has developed from a novelty to a handy device for reducing travel time, and then to a modern necessity. Besides being a necessity for most working people, the automobile has become an important investment due to the high and rising cost of modern vehicles. In earlier times, after purchase an automobile would remain in the family for many years. Today, an automobile may not only become obsolete quicker, but they generally don't have the life span that they once did even though prices are higher than ever before by comparison.

A vehicle may be at least the second largest big ticket item that a person will buy which makes it an important investment. A vehicle has to provide at least a certain amount of service to be cost effective, and then preferably be in good running condition and cosmetic appearance to re-sell or trade in to reduce the out-of-pocket cost for a new vehicle. Damage to the body of a vehicle drastically reduces the value of the vehicle. In addition, body damage also enables oxidation to set in. On a pickup, the bed sides and tailgate generally show the most marks and damage. Unfortunately, when a vehicle gets well used by the owner, the signs of wear and tear are obvious on the exterior of the body. A well used vehicle provides a valued service to the owner, while at the same time being reduced in value accordingly because of wear. Thus, a need exists for a reliable and cost effective solution to avoid the above-mentioned problems.

Various attempts have been made to solve the above-mentioned problems such as those found in U.S. Pat. No. 4,313,987 to James L. McCormick; U.S. Pat. No. 5,641,179 to Alan G. Imlach; and U.S. Pat. No. 5,938,263 to Scott Barthelman. This art is representative of truck and vehicle accessories.

None of the above inventions and patents, taken either singly or in combination, is seen to describe the invention as claimed.

Ideally, a vehicle body protector should provide vehicle body protection and ease of installation, and yet, would operate reliably and be manufactured at a modest expense. Thus, a need exists for a reliable exterior truck bed and tailgate armor to avoid the above-mentioned problems.

BRIEF SUMMARY OF THE INVENTION

In view of the foregoing disadvantages inherent in the known vehicle body protector art, the present invention provides a novel exterior truck bed and tailgate armor system. The general purpose of the present invention, which will be described subsequently in greater detail, is to provide a vehicle body protection and ease of installation.

The present invention, exterior truck bed and tailgate armor system, as disclosed herein, preferably comprises a truck-bed armor assembly having a left-side cover with a bottom-edge attachment, a plurality of top-edge attachers with a plurality of cushions, a right-side cover having a lower-edge attachment, a plurality of upper-edge attachers, a plurality of anti-rub pads, a tailgate cover comprising a lower periphery, an upper periphery having a plurality of attachment orifices, a hinge, a plurality of folding fasteners, and a plurality of inner padding spacers.

The truck-bed armor assembly comprising the left-side cover, the right-side cover, and the tailgate cover are structured and arranged to form-fit to the exterior surface of a pickup bed of a pickup truck. The truck-bed armor assembly nestably (externally) envelopes about the exterior surface of the pickup bed for whichever model and year it is designed for (model-specific). The truck-bed armor assembly is preferably manufactured for various models of different year vehicles and produced in various common vehicle colors. The left-side cover, the right-side cover, and the tailgate cover of the truck-bed armor assembly are able to be quickly installed or quickly removed from the pickup bed so that it is feasible to install and use when a task having known likelihood of scratches or dents is going to take place. The truck-bed armor assembly may be used continuously if the user desires to extend the new appearance of the exterior surfaces of the pickup bed.

The left-side cover is able to be attached parallel planar to the outer left side of the pickup bed. The bottom-edge attachment of the left-side cover is integral with the lower part of the left-side cover and preferably curls underneath the truck bed on both sides of the fender-well. The plurality of top-edge attachers of the left-side cover are rotatably attached to the top side of the left-side cover and are structured and arranged to clamp to the lip of the top edge of the left side of the pickup bed. The top-edge attachers of the left-side cover and the upper-edge attachers of the right-side cover preferably comprise screw g-clamps that quickly clamp without the use of tools. The top-edge attachers preferably remain with and are non-removably attached to the left-side cover and the right-side cover. In another embodiment of the truck-bed armor assembly, the top-edge attachers attach to and remain with the inside top edge of the bed, and fold away when not is use such that they do not obstruct the inside bed area. In yet another embodiment, the top-edge attachers are separate from the bed and the left and right-side covers. In any embodiment, the attachers preferably have a folding handle portion so that they are flush with the top surface of the left-side cover and right-side cover.

The plurality of folding fasteners for the upper periphery of the tailgate cover are structured and arranged to be recessed such that a plurality of hinged wing heads of the plurality of folding fasteners are nestably folded in a planar position with the inner truck bed surface of the tailgate cover. The screw g-clamps may be operably and non-removably attached to the left-side cover and the right-side covers. The screw g-clamps rotationally clamp the upper flange of the pickup bed and may be spring loaded and lever actuated for a vise clamping action. The truck-bed armor assembly further comprises contours corresponding specifically for various models of vehicles and preferably comprises cut-outs corresponding to the tail lights of the pickup bed, but in a second embodiment, may have clear sections over the tail lights. The left-side cover for most models may have a hinged cover for the pickup fuel cap door to allow fuel accessibility. The assembly may also have cut-outs corresponding to the pickup bed stake pocket holes to promote universal use. Some embodiments may use the stake pocket holes for attaching the upper sides of the assembly.

The cushions may be attached to the inner surface of the left-side cover such that the cushions prevent the exterior of the left side of the pickup bed from contacting the inner surface of the left-side cover to prevent abrasions to the pickup paint job. Drain holes may be an optional feature and located in the bottom-edge attachment of the left-side cover where water might collect during precipitation (to avoid corrosive effect) if included. The right-side cover is able to be attached parallel planar to the outer right-side of the pickup bed and the lower-edge attachment is integral with the right-side cover and hooks underneath the bottom periphery of the right side of the pickup bed. The plurality of upper-edge attachers are rotatably attached to the upper-edge of the right-side cover and are structured and arranged to clamp to the upper-edge lip of the right side of the pickup bed. The plurality of anti-rub pads are attached to the inside surface of the right-side cover such that the anti-rub pads prevent the outer surface of the right side of the pickup bed from contacting the inside surface of the right-side cover to prevent abrasions on the paint of the pickup bed. In another embodiment, the entire inside surface is covered with an anti-rub material to prevent abrasions to the paint. Each side cover may have a rubber seal that attaches to the inside above each fender well cut out.

The truck-bed armor assembly comprises a substantially rigid material such that the left-side cover, the right-side cover, and the tailgate cover are each unable to flex far enough or be pressed inward far enough to rub against the exterior surface of the pickup bed, yet able to flex far enough to conform to twisting or flexing of the bed when on uneven terrain. The truck-bed armor assembly may comprise a heavy gauge thermoplastic polymer allowing it to remain lightweight and yet be durable in use and resistant to corrosion. The tailgate cover is able to be attached parallel planar to the tailgate of the pickup truck, the upper periphery of the tailgate cover hingedly attached upper inner side of the tailgate surface and the lower periphery of the tailgate cover hooked underneath the molding lip of the tailgate. The plurality of attachment orifices are located in the upper periphery of the tailgate cover, the upper periphery fastened to the tailgate via the folding fasteners through the attachment orifices. The plurality of inner padding spacers are attached to the inner-facing contact surface of the tailgate cover such that the inner padding spacers prevent the rear-facing surface of the tailgate of the pickup bed from contacting the inner-facing contact surface of the tailgate cover.

The plurality of cushions, the plurality of anti-rub pads, and the plurality of inner padding spacers are adhesively attached to the inner surface of the left-side cover, the inside surface of the right-side cover, and the inner-facing contact surface of the tailgate respectively. The plurality of cushions, the plurality of anti-rub pads, and the inner padding spacers may comprise square adhesive pads but may be long strips which may preferably be adhesively attached to the entire inner surface perimeter of each piece of the assembly. The truck-bed armor assembly is very useful for attaching to the exterior surface of the pickup bed to provide an exteriorly located armored cover to prevent scratches and minor damage to the pickup bed during an event in which a high probability of damage is likely to occur.

A kit is embodied herein for the exterior truck bed and tailgate armor system that preferably comprises: at least one left-side cover having a plurality of cushions and a plurality of top-edge attachers, at least one right-side cover having a plurality of anti-rub pads and a plurality of upper-edge attachers, at least one tailgate cover having a plurality of inner padding spacers and a plurality of folding fasteners, and at least one set of user instructions.

In accordance with the embodiments of the present invention a preferred method of use is disclosed herein preferably comprising the steps of: hooking the bottom-edge attachment of the left-side cover underneath the truck bed on both sides of the fender-well; fastening the top-edge attachers to the left-side upper flange of a pickup bed; hooking the lower-edge attachment of the right-side cover underneath the truck bed on both sides of the fender-well; fastening the upper-edge attachers to the right-side upper flange of the pickup bed; hooking the angled lower lip of the tailgate cover under the molding lip of the lower periphery of the tailgate; hingedly attaching the tailgate cover along the top inner side of the pickup tailgate using the plurality of folding fasteners; using the truck-bed armor assembly; and removing the truck-bed armor assembly for storage.

The present invention holds significant improvements and serves as an exterior truck bed and tailgate armor system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, exterior truck bed and tailgate armor system, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a vehicle body protector and more particularly to an exterior truck bed and tailgate armor system as used to protect the pristine condition of the exterior of the bed of a pickup truck.

Generally speaking, the exterior truck bed and tailgate armor system is an armored cover for the exterior surface of a pickup bed that is able to be quickly installed to protect the exterior surface of the pickup bed from scratches and minor dents. The truck-bed armor assembly has three sections to cover the left side, the right side and the tailgate of the truck bed. The left side and right side covers have a curled lip at the bottom edge that hook underneath the bottom edges of the bed, and fasten to the top edge of the lip of the bed using clamps that may be attached and tightened without the use of tools. The tailgate section hinges along the width of the upper periphery and uses flush mounting threaded fasteners on the upper periphery.

Figure 1:
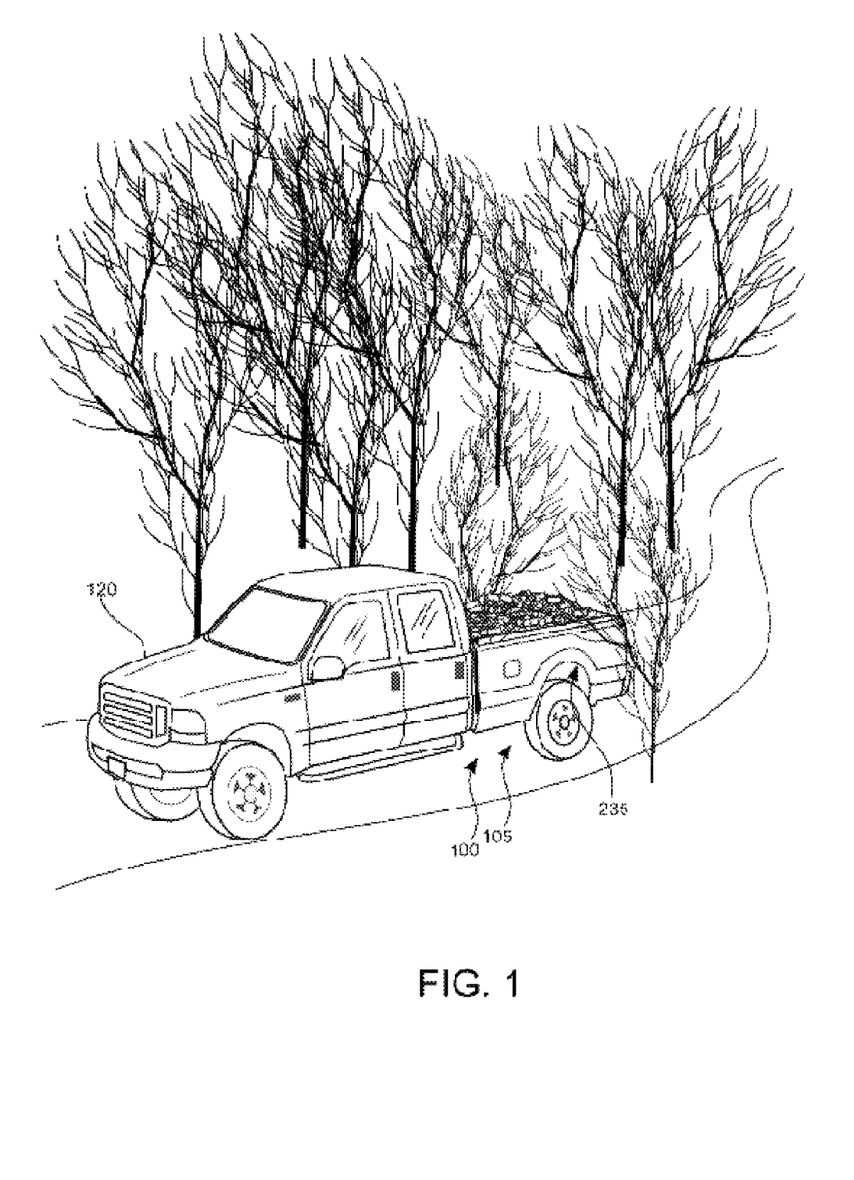
FIG. 1 shows a perspective view illustrating an in-use condition of an exterior truck bed and tailgate armor system according to an embodiment of the present invention.

In greater detail, referring to the drawings by numerals of reference there is shown in FIG. 1, a perspective view illustrating an in-use condition of exterior truck bed and tailgate armor system 100 according to an embodiment of the present invention.

Truck-bed armor assembly 105 is very useful for attaching to exterior surface 110 of pickup bed 115 to provide an exteriorly located armored cover to prevent scratches and minor damage to pickup bed 115 during an event in which a high probability of damage is likely to occur. Truck-bed armor assembly 105 comprising left-side cover 135, right-side cover 170, and tailgate cover 200 are structured and arranged to form-fit to exterior surface 110 of pickup bed 115 of pickup truck 120. Truck-bed armor assembly 105 nestably envelopes about exterior surface 110 of pickup bed 115 for whichever model and year it is designed for. Truck-bed armor assembly 105 is preferably manufactured for various models of different year vehicles and produced in various common vehicle colors. Left-side cover 135, right-side cover 170, and tailgate cover 200 of truck-bed armor assembly 105 are able to be quickly installed or quickly removed from pickup bed 115 so that it is feasible to install and use when a task having known likelihood of scratches or dents is going to take place. Truck-bed armor assembly 105 may be used continuously if user desires to extend the new appearance of the exterior surfaces of pickup bed 115.

Figure 2:
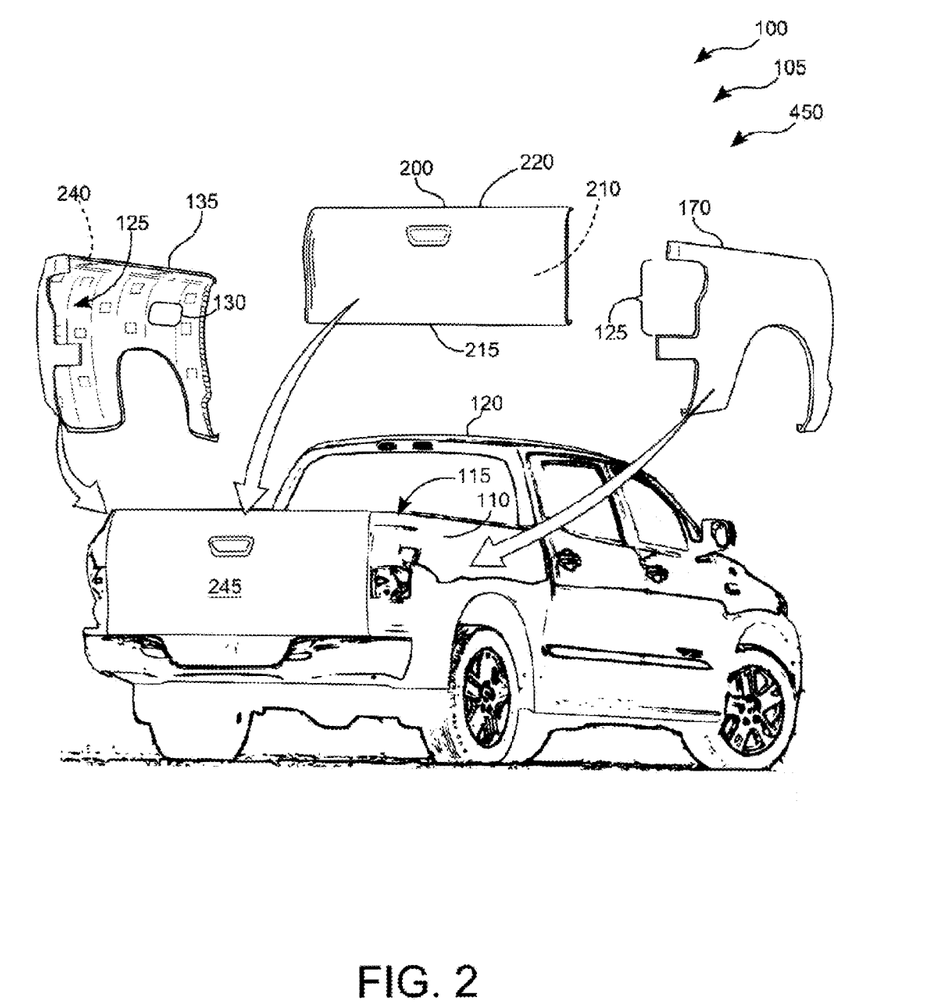
FIG. 2 is a perspective view illustrating the exterior truck bed and tailgate armor system according to an embodiment of the present invention of FIG. 1.

Referring now to FIG. 2, is a perspective view illustrating exterior truck bed and tailgate armor system 100 according to an embodiment of the present invention of FIG. 1.

Left-side cover 135 is able to be attached parallel planar to outer left side 140 of pickup bed 115. Bottom-edge attachment 145 of left-side cover 135 is preferably integral with the lower part of left-side cover 135 and curls underneath pickup bed 115 on both sides of fender-well 235. Top-edge attachers 155 of left-side cover 135 are rotatably attached to top side 152 of left-side cover 135 and are structured and arranged to clamp to the lip of the top edge of the left side of pickup bed 115.

Right-side cover 170 (in a similar but mirrored manner to left-side cover 135) is able to be attached parallel planar to outer right-side 175 of pickup bed 115 and lower-edge attachment 180 is integral with right-side cover 170 and hooks underneath bottom periphery 185 of the right side of pickup bed 115. Upper-edge attachers 190 are rotatably attached to inner upper-edge 187 of right-side cover 170 and are structured and arranged to clamp to the top edge of the right side of pickup bed 115. Some embodiments may use the stake pocket holes for attaching the top of left 135 and right-side covers 170. Truck-bed armor assembly 105 further comprises contours corresponding specifically to the various models of pickup trucks 120 and preferably comprises cut-outs 125 corresponding to the tail lights of pickup bed 115. Other embodiments may have clear sections over the tail lights. Universal versions may also be available.

Cushions 160, anti-rub pads 195, and inner padding spacers 205 may be adhesively attached to inner surface 148 of left-side cover 135, inside surface 183 of right-side cover 170, and inner-facing contact surface 210 of tailgate cover 200 respectively. Cushions 160, anti-rub pads 195, and inner padding spacers 205 may comprise square adhesive pads but may be long strips which are preferably adhesively attached to the entire inner surface perimeter of each piece of truck-bed armor assembly 105. Alternate attaching means may be employed.

Cushions 160 may be attached to inner surface 148 of left-side cover 135 such that cushions 160 prevent the exterior of left side of pickup truck 120 from contacting inner surface 148 of left-side cover 135 to prevent abrasions to pickup truck 120 paint job. Anti-rub pads 195 are attached to inside surface 183 of right-side cover 170 such that anti-rub pads 195 prevent the outer surface of the right side of pickup bed 115 from contacting inside surface 183 of right-side cover 170 to prevent abrasions on the paint of pickup bed 115. The truck-bed armor assembly 105 comprises a substantially rigid material such that the left-side cover 135, the right-side cover 170, and the tailgate cover 200 are each unable to flex far enough or be pressed inward far enough to rub against the exterior surface of the pickup bed 115, yet able to flex far enough to conform to twisting or flexing of the bed when driving over uneven terrain. Truck-bed armor assembly 105 may comprise a heavy gauge thermoplastic polymer allowing it to remain lightweight and yet be durable in use and resistant to corrosion (caused by trapped material and moisture. Drain holes, an optional feature if included, would be located in bottom-edge attachment 145 of left-side cover 135 where water might collect during precipitation. Drain through-holes, an optional feature of right-side cover 170, would be located in the bottom of lower-edge attachment 180.

Figure 3:
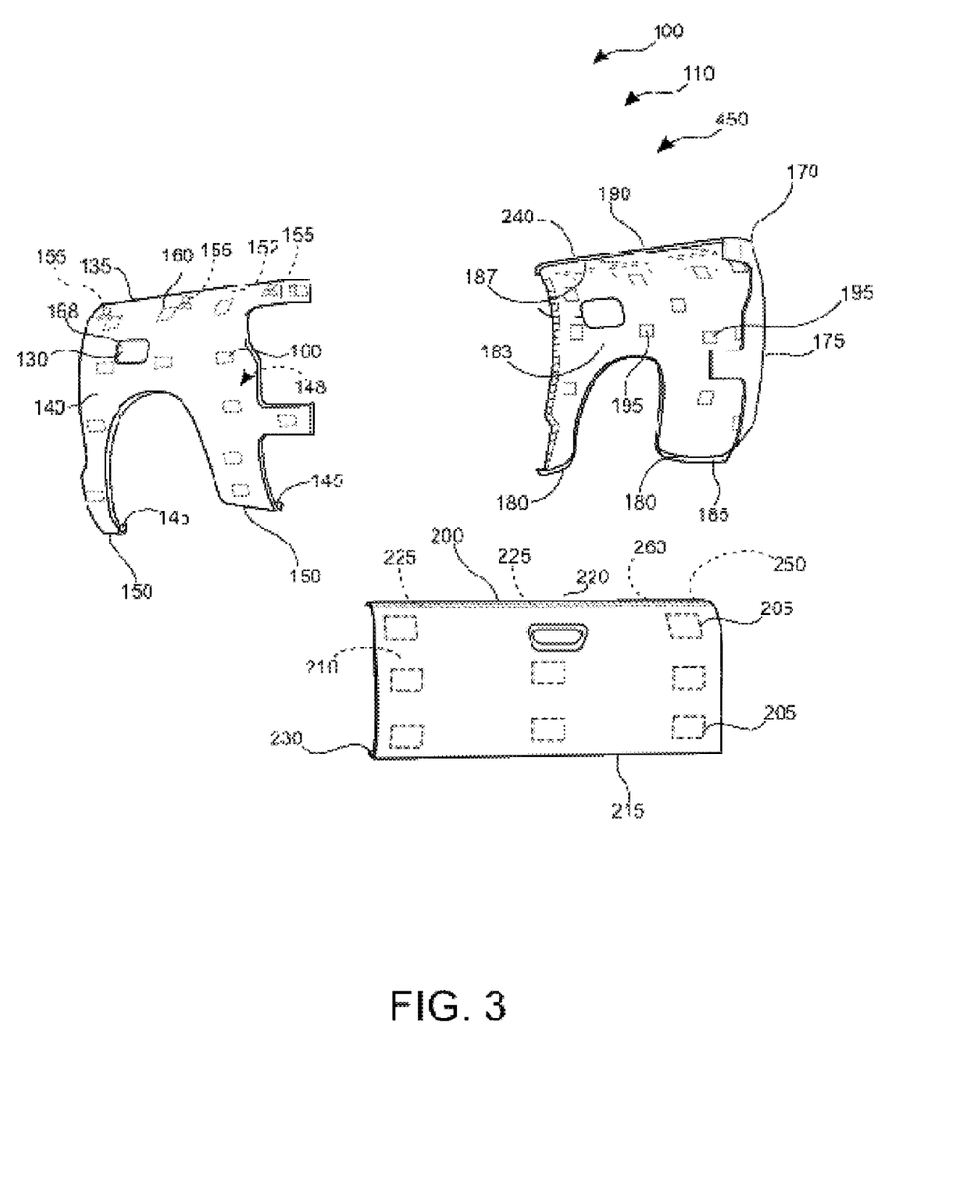
FIG. 3 is a perspective view illustrating a right-side cover, a left-side cover, and a tailgate cover of the exterior truck bed and tailgate armor system according to an embodiment of the present invention of FIG. 1.

Referring now to FIG. 3, is a perspective view illustrating right-side cover 170, left-side cover 135, and tailgate cover 200 of exterior truck bed and tailgate armor system 100 according to an embodiment of the present invention of FIG. 1.

Exterior truck bed and tailgate armor system 100 preferably comprises truck-bed armor assembly 105 having left-side cover 135 (with bottom-edge attachment 145, top-edge attachers 155, and cushions 160), right-side cover 170 (having lower-edge attachment 180, upper-edge attachers 190, and anti-rub pads 195), tailgate cover 200 (comprising lower periphery 215 having angled lower lip 230), upper periphery 220 (having attachment orifices 222, fasteners 225, and inner padding spacers 205.

Top-edge attachers 155 of left-side cover 135 and upper-edge attachers 190 of right-side cover 170 preferably comprise screw g-clamps 240 that quickly clamp without the use of tools. Screw g-clamps 240 are operably and non-removably attached to left-side cover 135 and right-side cover 170. Screw g-clamps 240 rotationally clamp the upper flange of pickup bed 115 and may be spring loaded and lever actuated for clamping. Left-side cover 135 for most models may have hinged cover 168 for pickup fuel cap door 130 to allow fuel accessibility. Truck-bed armor assembly 105 may also have cut-outs 125 corresponding to pickup bed 115 stake pocket holes to promote universal use.

Figure 4:
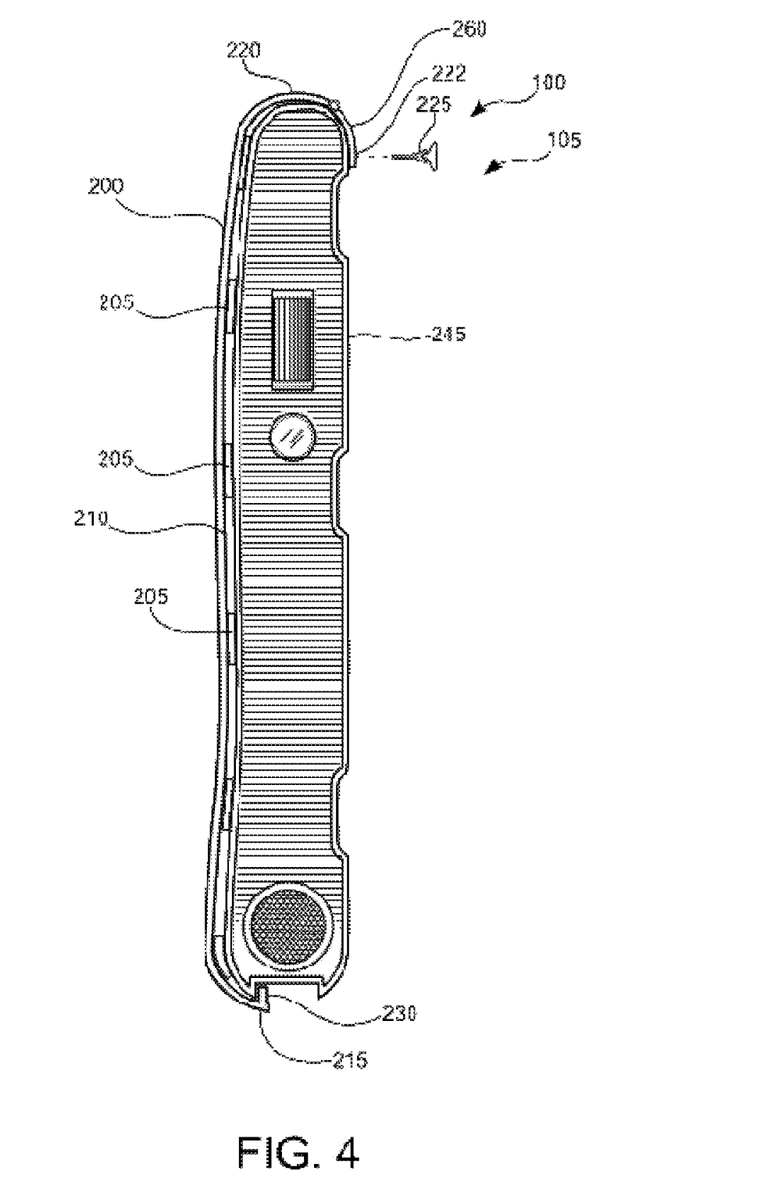
FIG. 4 is a perspective view illustrating an end cutaway view illustrating a tailgate cover of the exterior truck bed and tailgate armor system according to an embodiment of the present invention of FIG. 1.

Referring now to FIG. 4, showing a perspective view illustrating an end cutaway view illustrating tailgate cover 200 of exterior truck bed and tailgate armor system 100 according to an embodiment of the present invention of FIG. 1.

Folding fasteners 225 for tailgate cover 200 may be screws having hinged winged heads that may tighten or loosen without tools and are hinged to fold down flat into a planar position with the surface of tailgate cover 200 when it is installed. A second embodiment may have hex heads or screw heads requiring tightening or loosening with tools. Tailgate cover 200 is able to attached parallel planar to tailgate 245 of pickup truck 120.

Upper periphery 220 of tailgate cover 200 hingedly attaches to the top inside surface of the tailgate with the lower periphery 215 of tailgate cover 200 curling underneath the bottom molding lip of tailgate 245. Tailgate cover 200 in a preferred embodiment, has attachment portion 260 that hingedly attaches tailgate cover 200 to tailgate 245 via attachment orifices 222 that are located along the length of attachment portion 260 near upper periphery 220 of tailgate cover 200. Inner padding spacers 205 are attached to inner-facing contact surface 210 of tailgate cover 200 such that inner padding spacers 205 prevent the rear-facing surface of tailgate 245 of pickup bed 115 from contacting inner-facing contact surface 210 of tailgate cover 200. Angled lower lip 230 is located at lower periphery 215 of tailgate cover 200 for attaching lower periphery 215 of tailgate cover 200 to tailgate 245.

Exterior truck bed and tailgate armor system 100 may be sold as kit 450 comprising the following parts: at least one left-side cover 135 having a plurality of cushions 160 and a plurality of top-edge attachers 155; at least one right-side cover 170 having a plurality of anti-rub pads 195 and a plurality of upper-edge attachers 190; and tailgate cover 200 having fasteners 225; and at least one set of user instructions. The kit has instructions such that functional relationships are detailed in relation to the structure of the invention (such that the invention can be used, maintained, or the like in a preferred manner). Exterior truck bed and tailgate armor system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color/make/model combinations, parts may be sold separately, etc., may be sufficient.

Figure 5:
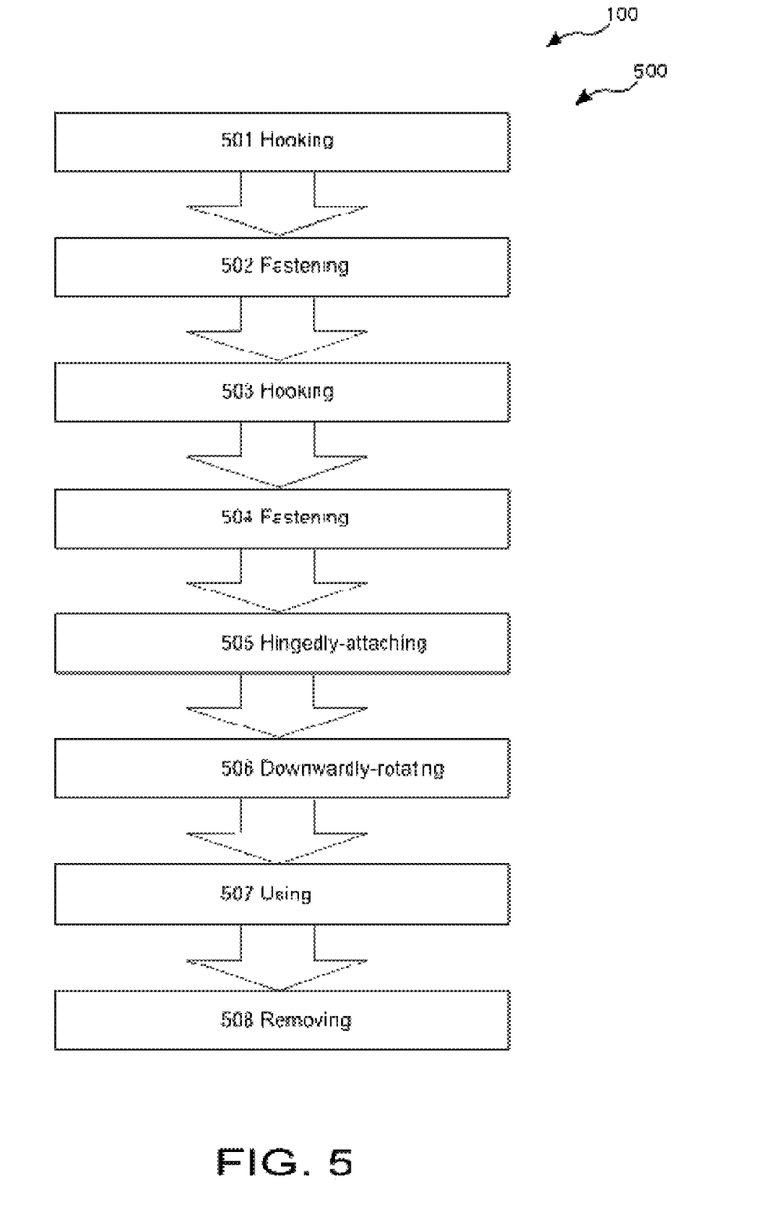
FIG. 5 is a flowchart illustrating a method of use for exterior truck bed and tailgate armor system according to an embodiment of the present invention of FIGS. 1-4.

Referring now to FIG. 5, showing method of use 500 for exterior truck bed and tailgate armor systems 100.

A method of using (method of use 500) exterior truck bed and tailgate armor systems 100 may comprise the steps of step one 501 hooking bottom-edge attachment 145 of left-side cover 135 underneath pickup bed 115 on both sides of fender-well 235; step two 502 fastening top-edge attachers 155 to the left-side upper flange of pickup bed 115; step three 503 hooking lower-edge attachment 180 of right-side cover 170 underneath pickup bed 115 on both sides of right-rear fender-well 235; step four 504 fastening upper-edge attachers 190 to the right-side upper flange of pickup bed 115; step five 505; hooking angled lower lip 230 of tailgate cover 200 beneath the lower molding lip of tailgate 245; step six 506 hingedly attaching tailgate cover 200 to upper inside surface of pickup truck 120 tailgate 245 using the plurality of folding fasteners 225; step seven 507 using truck-bed armor assembly 105; and step eight 508 removing truck-bed armor assembly 105 for storage.

It should be noted that step 508 is an optional step and may not be implemented in all cases. Optional steps of method 500 are illustrated using dotted lines in FIG. 5 so as to distinguish them from the other steps of method 500.

It should be noted that the steps described in the method of use can be carried out in many different orders according to user preference. The use of "step of" should not be interpreted as "step for", in the claims herein and is not intended to invoke the provisions of 35 U.S.C. §112, ¶6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. An exterior truck bed and tailgate armor system comprising:
   a truck-bed armor assembly comprising;
      a left-side cover having;
         a bottom-edge attachment;
         a plurality of top-edge attachers; and
         a plurality of cushions;
      a right-side cover having;
         a lower-edge attachment;
         a plurality of upper-edge attachers; and
         a plurality of anti-rub pads;
      a tailgate cover having;
         a lower periphery;
         an upper periphery having a plurality of attachment orifices;
         a plurality of folding fasteners; and
         a plurality of inner padding spacers;
   wherein said truck-bed armor assembly comprising said left-side cover, said right-side cover, and said tailgate cover are structured and arranged to form-fit to an exterior surface of a pickup bed of a pickup truck;
   wherein said left-side cover is able to be attached parallel planar to said outer left side of said pickup bed, said bottom-edge attachment integral with said left-side cover and hooking underneath a bottom edge of said left side of said pickup bed;

wherein said plurality of top-edge attachers are rotatably attached to an inner top side of said left-side cover and are structured and arranged to clamp to a top edge lip of said left side of said pickup bed;

wherein said plurality of cushions are attached to an inner surface of said left-side cover such that said cushions prevent an exterior of said left side of said pickup bed from contacting said inner surface of said left-side cover;

wherein said right-side cover is able to be attached parallel planar to said outer right-side of said pickup bed, said lower-edge attachment integral with said right-side cover and hooking underneath a bottom periphery of said right side of said pickup bed;

wherein said plurality of upper-edge attachers are rotatably attached to an inner upper-edge of said right-side cover and are structured and arranged to clamp to an upper-edge lip of said right side of said pickup bed;

wherein said plurality of anti-rub pads are attached to an inside surface of said right-side cover such that said anti-rub pads prevent an outer surface of said right side of said pickup bed from contacting said inside surface of said right-side cover;

wherein said tailgate cover is able to be attached parallel planar to a tailgate of said pickup truck, said upper periphery of said tailgate cover hingedly attached to a top inner side of said tailgate and said lower periphery of said tailgate cover hooked underneath a shell lip of said tailgate via an angled lower lip;

wherein said plurality of attachment orifices are located in said upper periphery of said tailgate cover, said upper periphery fastened to said tailgate via said folding fasteners through said attachment orifices;

wherein said plurality of inner padding spacers are attached to an inner-facing contact surface of said tailgate cover such that said inner padding spacers prevent a rear-facing surface of said tailgate of said pickup bed from contacting said inner-facing contact surface of said tailgate cover; and wherein said truck-bed armor assembly is useful for attaching to said exterior surface of said pickup bed to provide an exteriorly located armored cover to prevent scratches and minor damage to said pickup bed during an event wherein a high probability of damage is likely to occur.

2. The exterior truck bed and tailgate armor system of claim 1 wherein said top-edge attachers of said left-side cover and said upper-edge attachers of said right-side cover comprise screw g-clamps.

3. The exterior truck bed and tailgate armor system of claim 1 wherein said truck-bed armor assembly is structured and arranged to nestably envelope about an exterior surface of a pickup bed of a pickup.

4. The exterior truck bed and tailgate armor system of claim 3 wherein said truck-bed armor assembly further comprises contours corresponding specifically to at least one model of vehicle.

5. The exterior truck bed and tailgate armor system of claim 4 wherein said truck-bed armor assembly comprises cut-outs corresponding to a plurality of pickup bed stake pocket holes to promote universal use.

6. The exterior truck bed and tailgate armor system of claim 5 wherein said truck-bed armor assembly comprises thermoplastic polymer such that said truck-bed armor assembly is lightweight and durable in use, yet resistant to corrosion.

7. The exterior truck bed and tailgate armor system of claim 6 wherein said truck-bed armor assembly comprises cut-outs corresponding to at least one tail light of said pickup bed.

8. The exterior truck bed and tailgate armor system of claim 7 wherein said truck-bed armor assembly comprises a substantially rigid material such that said left-side cover, said right-side cover, and said tailgate cover are each unable to flex and rub against said exterior surface of said pickup bed.

9. The exterior truck bed and tailgate armor system of claim 8 wherein said truck-bed armor assembly comprises transparent tail light sections.

10. The exterior truck bed and tailgate armor system of claim 9 wherein said truck-bed armor assembly comprises foldable tie-down hooks.

11. The exterior truck bed and tailgate armor system of claim 1 wherein said plurality of cushions, said plurality of anti-rub pads, and said plurality of inner padding spacers are adhesively attached to said inner surface of said left-side cover, said inside surface of said right-side cover, and said inner-facing contact surface of said tailgate respectively.

12. The exterior truck bed and tailgate armor system of claim 1 wherein said screw g-clamps are operably and non-removably attached to said left-side cover and said right-side cover, said screw g-clamps rotationally clamping an upper flange of said pickup bed.

13. The exterior truck bed and tailgate armor system of claim 1 wherein said left-side cover, said right-side cover, and said tailgate cover of said truck-bed armor assembly are able to be quickly installed and alternately quickly removed from said pickup bed.

14. The exterior truck bed and tailgate armor system of claim 1 wherein said left-side cover comprises a hinged cover for a pickup fuel cap door to allow fuel accessibility.

15. The exterior truck bed and tailgate armor system of claim 1 wherein said plurality of folding fasteners for said upper periphery of said tailgate cover are structured and arranged to fold flat such that a plurality of hinged wing heads of said plurality of folding fasteners are nestably folded in a planar position with an inner said truck bed surface of said tailgate cover.

16. The exterior truck bed and tailgate armor system of claim 1 wherein said plurality of cushions, said plurality of anti-rub pads, and said inner padding spacers comprise square adhesive pads.

17. The exterior truck bed and tailgate armor system of claim 1 wherein said left-side cover and said right-side cover comprise fender well flares.

18. An exterior truck bed and tailgate armor system comprising:
　a truck-bed armor assembly comprising;
　　a left-side cover having;
　　　a bottom-edge attachment;
　　　a plurality of top-edge attachers; and
　　　a plurality of cushions;
　　a right-side cover having;
　　　a lower-edge attachment;
　　　a plurality of upper-edge attachers; and
　　　a plurality of anti-rub pads;
　　a tailgate cover having;
　　　a lower periphery;
　　　an upper periphery having a plurality of attachment orifices;
　　　a plurality of folding fasteners; and
　　　a plurality of inner padding spacers;
　wherein said truck-bed armor assembly comprising said left-side cover, said right-side cover, and said tailgate cover are structured and arranged to form-fit to an exterior surface of a pickup bed of a pickup truck;

wherein said truck-bed armor assembly is structured and arranged to nestably envelope about an exterior surface of a pickup bed of a pickup;

wherein said left-side cover, said right-side cover, and said tailgate cover of said truck-bed armor assembly are able to be quickly installed and alternately quickly removed from said pickup bed;

wherein said left-side cover is able to be attached parallel planar to said outer left side of said pickup bed, said bottom-edge attachment integral with said left-side cover and hooking underneath a bottom edge of said left side of said pickup bed;

wherein said plurality of top-edge attachers are rotatably attached to an inner top side of said left-side cover and are structured and arranged to clamp to a top edge lip of said left side of said pickup bed;

wherein said top-edge attachers of said left-side cover and said upper-edge attachers of said right-side cover comprise screw g-clamps;

wherein said plurality of folding fasteners for said upper periphery of said tailgate cover are structured and arranged to fold flat such that a plurality of hinged wing heads of said plurality of fasteners are nestably folded in a planar position with an inner said truck bed surface of said tailgate cover;

wherein said screw g-clamps are operably and non-removably attached to said left-side cover and said right-side cover, said screw g-clamps rotationally clamping an upper flange of said pickup bed;

wherein said truck-bed armor assembly further comprises contours corresponding specifically to at least one model of vehicle;

wherein said truck-bed armor assembly comprises cut-outs corresponding to at least one tail light of said pickup bed;

wherein said left-side cover comprises a hinged cover for a pickup fuel cap door to allow fuel accessibility;

wherein said truck-bed armor assembly comprises cut-outs corresponding to a plurality of pickup bed stake pocket holes to promote universal use;

wherein said plurality of cushions are attached to an inner surface of said left-side cover such that said cushions prevent an exterior of said left side of said pickup bed from contacting said inner surface of said left-side cover;

wherein said right-side cover is able to be attached parallel planar to said outer right-side of said pickup bed, said lower-edge attachment integral with said right-side cover and hooking underneath a bottom periphery of said right side of said pickup bed;

wherein said plurality of upper-edge attachers are rotatably attached to an inner upper-edge of said right-side cover and are structured and arranged to clamp to an upper-edge lip of said right side of said pickup bed;

wherein said plurality of anti-rub pads are attached to an inside surface of said right-side cover such that said anti-rub pads prevent an outer surface of said right side of said pickup bed from contacting said inside surface of said right-side cover;

wherein said truck-bed armor assembly comprises a substantially rigid material such that said left-side cover, said right-side cover, and said tailgate cover are each unable to flex and rub against said exterior surface of said pickup bed;

wherein said truck-bed armor assembly comprises thermoplastic polymer such that said truck-bed armor assembly is lightweight and durable in use, yet resistant to corrosion;

wherein said tailgate cover is able to be attached parallel planar to said tailgate of said pickup truck, said upper periphery of said tailgate cover hingedly attached to a top inner side of a tailgate and said lower periphery of said tailgate cover hooked underneath a shell lip of said tailgate via an angled lower lip;

wherein said plurality of attachment orifices are located in said upper periphery of said tailgate cover, said upper periphery fastened to said tailgate via said folding fasteners through said attachment orifices;

wherein said plurality of inner padding spacers are attached to an inner-facing contact surface of said tailgate cover such that said inner padding spacers prevent a rear-facing surface of said tailgate of said pickup bed from contacting said inner-facing contact surface of said tailgate cover;

wherein said plurality of cushions, said plurality of anti-rub pads, and said plurality of inner padding spacers are adhesively attached to said inner surface of said left-side cover, said inside surface of said right-side cover, and said inner-facing contact surface of said tailgate respectively;

wherein said plurality of cushions, said plurality of anti-rub pads, and said inner padding spacers comprise square adhesive pads; and wherein said truck-bed armor assembly is useful for attaching to said exterior surface of said pickup bed to provide an exteriorly located armored cover to prevent scratches and minor damage to said pickup bed during an event wherein a high probability of damage is likely to occur.

19. The exterior truck bed and tailgate armor system of claim 18 further comprising a kit including:
   at least one said left-side cover having said plurality of cushions and said plurality of top-edge attachers;
   at least one said right-side cover having said plurality of anti-rub pads and said upper-edge attachers;
   at least one said tailgate cover having said plurality of inner padding spacers and said plurality of fasteners; and
   at least one set of user instructions.

20. A method of using an exterior truck bed and tailgate armor system comprising the steps of:
   hooking a bottom-edge attachment of a left-side cover underneath both sides of left-rear fender-well;
   fastening a plurality of top-edge attachers to a left-side upper flange of a pickup bed;
   hooking a lower-edge attachment of a right-side cover underneath both sides of right-rear fender-well;
   fastening a plurality of upper-edge attachers to a right-side upper flange of said pickup bed;
   hooking an angled lower lip of a tailgate cover beneath a bottom molding lip of a tailgate;
   hingedly attaching a tailgate cover to a top inner side of a pickup tailgate using a plurality of folding fasteners;
   using a truck-bed armor assembly; and
   removing said truck-bed armor assembly for storage.

* * * * *